United States Patent Office 3,401,692
Patented Sept. 17, 1968

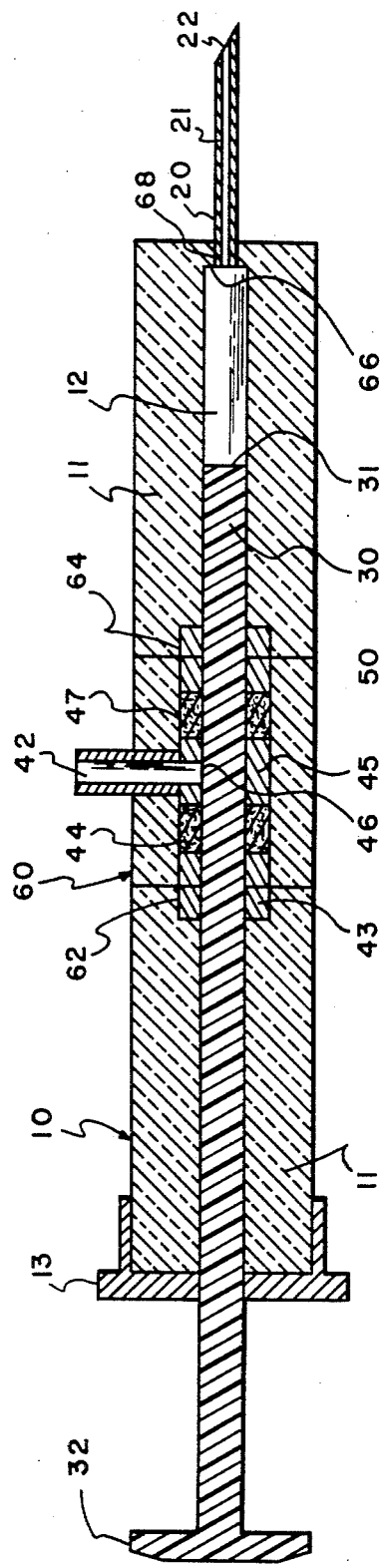
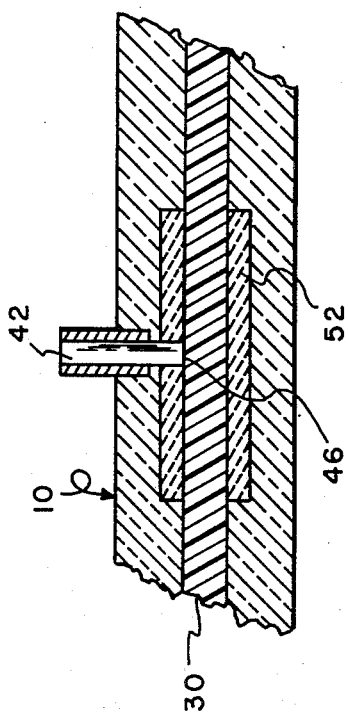
FIG. 4
FIG. 5

1

3,401,692
SYRINGE PROVIDED WITH A LATERAL VENT
AND HAVING HIGH COMPRESSION SEALS
WITHIN THE SYRINGE BORE
Rano Joseph Harris, Jr., Baton Rouge, La., assignor, by mesne assignments, to Micro-Tek Instruments Corporation, Baton Rouge, La., a corporation of Texas
Filed June 26, 1964, Ser. No. 378,349
16 Claims. (Cl. 128—218)

This invention relates in general to devices for dispensing measured quantities of liquids and more particularly to syringes which are capable of accurately dispensing very small, measured quantities of liquid.

Needle syringes have been widely used in the chemical, biological, and medical arts for dispensing small, measured quantities of liquid materials. For example, in the field of gas chromatography a standard procedure for introducing a liquid sample into a chromatograph has been the use of a form of hypodermic syringe which is used to inject the sample into the vaporization chamber of the chromatograph through a rubber septum. This system has always had drawbacks, many of which lay in the design of the sampling syringe. Some of these drawbacks are:

(1) When placed under pressure, the plungers of the syringes often leak and allow some portions of the sample to be retained in the barrel of the syringe. Since this leaked-by volume of liquid is not injected by the instrument, the measurement of the sample is often highly inaccurate.

(2) The syringes now in use are very difficult to clean. Therefore, the leaked-by volume of sample mentioned above remains in the syringe from one sample to the next, and thereby disrupts the results of the analysis of the next sample is different in composition from the volume remaining in the syringe after a prior injection.

(3) Hypodermic syringes, especially those of very small volume, are extremely difficult to fill in an accurate and precise manner.

These inherent faults in the design of prior needle syringes also manifest themselves when such syringes are used to dispense measured quantities of liquids in preparing standard solutions; in introducing reagents, reactants, catalysts, or the like into reaction systems; and in injecting serums, drugs, vaccines, medicaments, or the like into living tissue. Contamination from one injection to the next as a result of residual quantities, even trace quantities, of previously used liquids remaining in the barrel, in the dead volume or in other portions of the syringe can be a particularly serious problem where toxics or potent physiologically active agents have been used in a prior injection.

The most advanced state of the published art on needle syringes adapted for use in gas chromatography appears to be reflected in U.S. Patents 2,933,087, 3,035,616, and 3,101,084.

An object of this invention is to advance the state of this art by providing a syringe construction which is free from most, if not all, of the foregoing inherent faults, defects, and limitations.

Another object is to provide a syringe that is durable and that results in simple, efficient, and accurate operation.

Another object is to provide a syringe of the character described in which leakage of samples into the barrel is eliminated.

A further object is to provide a syringe of the type in question which is easily filled with the liquid to be dispensed.

2

Still another object is to provide a syringe device that can readily be cleansed and freed of residue of one or more prior injections and thereby eliminate contamination problems, such as those referred to above.

A still further object is to provide a unique needle syringe construction which is capable of dispensing extremely small, measured quantities of expellable liquids with precession and accuracy.

Another object is to provide a syringe capable of dispensing measured volumes of gases with precision and accuracy.

Still another object is to provide a syringe requiring none of the manipulations associated with the removal and replacement of needles, as in cleaning operations.

A further particular object of this invention is to provide a needle syringe of the character described which is adapted for use in injecting liquid samples into the inlet systems of gas chromatographs, but which is entirely suitable for other similar or related uses, such syringe being characterized in that it can be readily purged of any remaining traces of a prior injected sample, in that it can be easily filled with the expellable liquid sample to be injected, in that it can accurately deliver minute measured quantities of the sample under pressure without leakage, in that it is durable and has a long useful life, and in that it provides simple, efficient, and accurate operation in general.

Other objects, characteristics, features, and advantages of this invention will become apparent from the ensuing description and claims and the accompanying drawings in which:

Figure 1:
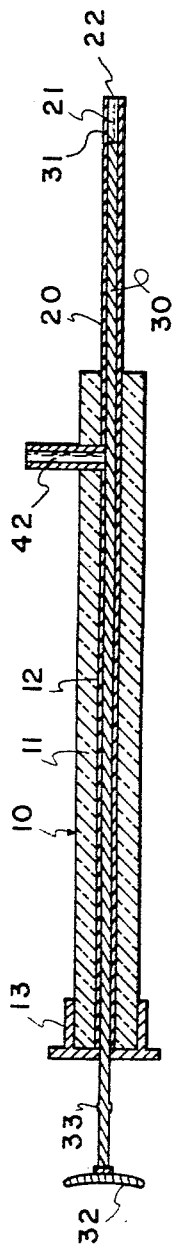
FIGURE 1 is a sectional view of a syringe of this invention taken along its longitudinal axis.

FIGURE 4 is a sectional view of another particularly preferred syringe in this invention which is well suited for handling larger volumes of expellable liquids, and indeed gases, and which likewise comprises an effective dual sealing construction obviating leakage and by-pass during use; and FIGURE 5 is an enlarged fragmentary section of another form of sealing means for use in various syringes of this invention.

Referring to the figures the present syringe comprises a tubular body indicated generally by the numeral 10, a hollow needle or cannula 20, a plunger 30 mounted to slidably travel within the syringe, and a vent line or tube 42 which laterally communicates with the bores which are within and axially-aligned throughout the entire syringe. Vent line 42 is positioned so as to be blocked off by plunger 30 as the plunger commences travel toward the expulsion end of the syringe. Therefore, vent line 42 is positioned such that the locus of this lateral communication is relatively remote from needle tip 22 yet ahead of plunger tip 31 when plunger 30 is sufficiently retracted into tubular body 10. For example, in FIGURE 4 the locus of lateral communication is at about the midpoint of body 10.

Figure 2:
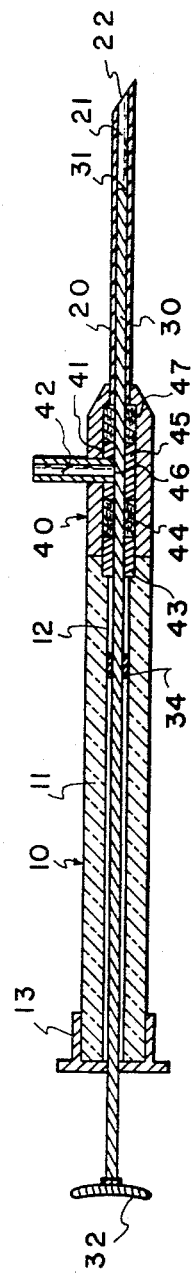
FIGURE 2 is a sectional view of a preferred syringe of this invention containing, inter alia, an effective dual sealing arrangement which insures against leakage during use.
Figure 3:
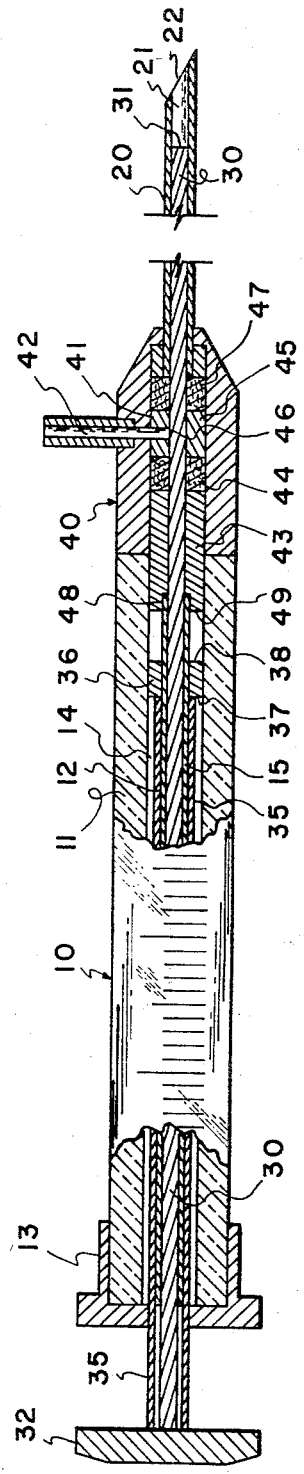
FIGURE 3 is an enlarged fragmentary section of a particularly preferred syringe of this invention comprising not only a dual sealing arrangement but a superior plunger guidance and control arrangement which prevents damage to the plunger, which in turn prevents damage to the seals, thereby eliminating leakage indefinitely.

Plunger 30 may be mounted to slidably travel, inter alia, within needle 20 as in the constructions depicted in FIGURES 1, 2 and 3, or its slidable travel may be confined to within tubular body 10 as in the construction illustrated in FIGURE 4. For handling and dispensing extremely small samples (e.g., quantities up to several microliters) constructions such as shown in FIGURES 1, 2 and 3 are usually preferable inasmuch as slidable travel of the plunger into the needle virtually eliminates dead space within the syringe. With larger volumes of liquids, and with gases, it is usually preferable to utilize a syringe construction of the type depicted in FIGURE 4 as the amount of dead space is insignificant in relation to the volume which can be dispensed or expelled with such syringes. Furthermore, the construction illustrated in FIGURE 4 permits the use of small needles even for large samples.

Referring to FIGURES 1, 2, 3, and 4 needle 20 has a generally elongate configuration and has a bore 21 longitudinally positioned therein, usually an essentially uniform bore. For best results needle bore 21 will be uniform throughout its entire length. The expulsion end or tip 22 of the needle will normally be diagonally beveled and tapered to a point with the trailing edges buffed dull to minimize coring of septa or diaphragms, although blunt tubular tips or other configurations are suitable for certain applications.

Needle 20 is mounted on an end of the tubular body 10 either by means of direct attachment to barrel 11 as in FIGURES 1 and 4 or via a hollow boss assembly indicated generally by the numeral 40, as in FIGURES 2 and 3. In either event needle bore 21 axially communicates with a longitudinal bore 12 within the tubular body. The length of plunger 30 in the devices of FIGURES 1, 2 and 3 is generally such that when its explusion face 31 is adjacent needle tip 22 the stem of the plunger extends through needle bore 21, then through the bore 41 of boss assembly 40 (if employed), then through barrel bore 12, and thence through and beyond an aperture generally centrally positioned in the face of a ferrule or cap 13 mounted (preferably, detachably mounted) on the back end of the barrel. The device of FIGURE 4 has a plunger whose length exceeds the length of tubular body 10 but is independent of the needle length. The back end of the plunger is usually fitted with a thumb button 32.

The device of FIGURE 1 is a simpler syringe construction in the sense that the liquid explusion system consists of a single uniform bore 21 through the needle 20 and the barrel 11, and a plunger 30 which slidably travels in this bore. Since there are no sealing means provided in this embodiment, this bore and at least a portion of the plunger—normally the entire portion of the plunger which slides within the bore—are precision fitted usually with a ground fit or an interference fit involving tolerances in the order of less than 0.0001 inch. In this connection it has been established and verified experimentally that even with precision fits of this closeness liquids having viscosities close to that of water can be contained thereby for relatively short periods of time (e.g., up to 30 seconds) at 100 p.s.i. pressure. However, this is sufficient to permit proper ejection of the sample.

In the simpler syringes of this invention, such as shown in FIGURE 1, it is desirable to mount an annular stop or sleeve 33 on the portion of the plunger which protrudes outwardly beyond ferrule 13. This stop is so positioned as to confine the forward sliding motion of the plunger to behind the explusion end 22 of the needle. In other words stop 33 contacts the outer face of ferrule 13 when the explusion face 31 of the plunger is adjacent, or nearly adjacent, needle tip 22.

The vent line 42 makes the syringes of this invention very easy to clean. Residue from prior usage of the syringe can readily be flushed out of the device by retracting the piston so that its expulsion end is behind the above-described locus of lateral communication and then flowing suitable liquid—usually a discardable portion of the liquid to be utilized in the next injection—into the needle tip 22 and allowing it to exit through vent line 42. This flow may be effected by gravity, pressure, or vacuum, a particularly convenient procedure being to draw the flushing liquid through the needle and vent tube by means of a suction bulb fitted onto the vent tube. Reverse flushing, i.e., into the vent tube and out the needle tip, is also feasible.

The vent line also makes it extremely easy to fill the syringe accurately. This is accomplished by bringing the sample liquid through the needle, by gravity flow, pressure, or vacuum, and out through the vent tube. When the entire line is filled with sample the flow is shut off by pushing the plunger forward to block off the vent hole. Again it is feasible to use the reverse method for filling, in which case the sample is introduced through the vent tube and out the needle until the plunger is pushed forward to seal off the vent hole. With a transparent barrel, such as glass, a graduated scale thereon utilized in conjunction with an index mark or reference point on the plunger stem enables the injection of a precisely measured volume of the sample. If the barrel is constructed of metal or other suitable non-transparent material the same result may be achieved by providing a graduated scale on the plunger stem, the outer face of ferrule 13 serving as a convenient reference point.

It will now be apparent that vent tube 42 enables the flushing and filling operations to be combined. For example, after a given sample has been injected the plunger is retracted to uncover the vent hole and a vacuum line is attached to the vent tube. Thereupon the needle tip is placed into a body of a different liquid from which a representative sample is to be taken for the next injection. After a sufficient amount of this latter liquid has passed through the system to free it of any traces of the former liquid and to completely fill the system with the desired liquid, the flow of the same is shut off by pushing the plunger forward to block off the vent hole.

A distinctly preferred embodiment of this invention involves the provision of sealing means on both sides of the vent tube, the sealing means being adapted to operate upon the circumferential surface of the plunger. Such sealing means, which are illustrated in FIGURES 2, 3, 4, and 5 prevent any possibility of leakage and obviate the need for a precision fit between the plunger and the bore(s) in which it slidably travels. In fact, because of the effectiveness of the sealing means to be described hereinafter tolerances well in excess of 0.0001 inch annular clearance—e.g., up to about 0.01 inch—are entirely satisfactory.

In the form of the invention depicted in FIGURES 2 and 3, the sealing means are preferably positioned within the hollow boss assembly 40 which also carries vent tube 42. The bore 41 within the boss assembly is most conveniently made up of cylindrical sleeve 43 which partially extends into barrel 11 and which therefore serves in part as a means for mounting the boss assembly on the forward end of the barrel. Sleeve 43 commuciates with tubular collect 44 which in turn communicates with cylindrical sleeve 45 which is provided with an aperture 46 leading to vent tube 42 in a generally T-shaped plan. The forward end of sleeve 45 communicates with tubular collet 47 which in turn usually communicates with the inner end of needle 20, although additional collar or sleeve means (not shown) may be placed therebetween if desired. As is apparent from the figures under discussion sleeves 43, 45 and collets 44, 47 alternating therewith are all axially aligned to form a continuous bore 41 within the boss assembly, bore 41 being a small segment of the longitudinal bore extending from the aperture in ferrule 13 to needle tip 22.

The tubular collets 44 and 47 are preferably made of resilient material, such as natural of synthetic rubber or any other suitable elastomer or elastoplastic, and are closely fitted to the stem of plunger 30 at all times during which the same is positioned or traveling through the collet bores. In short, these collets are under circumferential and/or radial tension sufficient to effect a high pressure seal with the plunger stem yet insufficient to prevent or markedly impair slidable travel of the plunger stem therethrough.

Another method of effecting a high pressure seal to prevent liquid or gas by-pass into the anterior position of the syringes of this invention is depicted in FIGURE 5. In this case a non-elastic bearing material such as graphite, boron nitride, molybdenum sulfide, or the like is employed in the form of tubular collet or sleeve 52, the axial bore of which is precision ground or lapped in contact with the plunger stem 30 so as to form a seal capable of containing water for at least 30 seconds at 100 p.s.i. pressure and yet permit slidable travel of stem 30 therethrough. As shown in FIGURE 5, sleeve 52 is a single element having a lateral bore so as to provide aperture 46 leading to vent tube 42, this lateral bore being located generally at the mid-point of the sleeve. Such positioning of the aperture provides an ample length of a piston-type seal on each side of the aperture to prevent leakage and fluid by-pass. It wil be appreciated however that sleeve 52 can be divided into two (or more) spaced apart sleeves in axial alignment, at least one of which is on each side of the vent tube 42. If desired, a combination of one or more precision ground non-elastic bearing sleeves 52 can be axially aligned with one or more elastic tubular collets 44, 47 to effect the high pressure seal with the plunger stem.

The preferred sealing means of this invention are the resilient collets 44, 47 since they eliminate the necessity of precision grinding or lapping operations and they result in less wear on the plunger stem.

In the embodiment depicted in FIGURE 2, there is a cylindrical stop or sleeve 34 mounted on the portion of the plunger stem which normally is encased within barrel bore 12. This stop serves to restrict or confine the slidable travel of the explusion end of the plunger 31 to between needle tip 22 and a locus within the bore 41 of boss assembly 40 behind aperture 46 but preferably ahead of collet 44. Thus in FIGURE 2 stop 34 is arranged so as to abut sleeve 43 when plunger face 31 is at or near needle tip 22—sleeve 43 serving not only this function but, as noted above, serving as a means for attaching boss assembly 40 to barrel 11—and so as to abut the inner face of ferrule 13 when plunger face 31 is at a desired locus within boss assembly bore 41.

FIGURE 2 shows stop 34 as a separate element which is fixedly mounted on the stem of plunger 30 by means, for example of suitable adhesives, welding, soldering or the like. It will be understood and appreciated however that if desired stop 34 can be formed as an integral part of the plunger.

FIGURE 3 illustrates a particularly preferred syringe construction of this invention.

In this embodiment the barrel 11 is provided not only with the central longitudinal bore 12 but with an annular passage 14 in coaxial or concentric alignment therewith. Bore 12 and passage 14 are most conveniently formed by providing, along the axis of the barrel, a bore having a desired diameter corresponding to the outer diameter of sleeve 43. Sleeve 43 in turn is fitted on its back end with a uniform annular cylindrical recess 48 to receive a portion of the forward end of tube 15, the bore of which serves as barrel bore 12. A bond is formed between tube 15 and recess 48 (e.g., by welding, soldering, cementing, or otherwise effecting a tight seal at the junction therebetween) so as to fixedly align the tube about the longitudinal axis of barrel 11. Most preferably tube 15 is long enough to extend to the back end of the barrel and its bore 12 is of the same diameter as and is axially aligned with bore 41 within the boss assembly, bore 41 in turn having the same diameter as and being axially aligned with bore 21 within the needle (all as shown). This provides an overall generally uniform bore through which plunger 30 can slidably travel and to which the plunger is fitted. As noted above, this fit need not be a precision, interference, or slight interference fit (although it may be if desired) because of the effectiveness of the sealing means provided within the tubular body. Thus except in the situation where plunger 30 is precisely fitted to the entire bore in which it travels, there will be variations in the overall bore diameter. That is to say, in a syringe of this invention in which the plunger is fitted to the barrel and needle bores by a loose slip fit there will be a reduction in the overall bore diameter prevailing at the area(s) of contact between the sealing means and the plunger stem.

Although sleeve 43 and tube 15 have been to as separate but cooperating elements it will be understood and appreciated that these elements can be machined from a single hollow tube (e.g., a tube initially corresponding in wall thickness to sleeve 43 but having a length equal to these two elements when joined) thereby forming a single integral part.

Cooperating with the foregoing bore and coaxial passage construction of FIGURE 3 are plunger 30 and plunger sleeve 35 mounted on thumb button 32. Plunger sleeve 35 is in concentric coaxial alignment with plunger 30, has an inner diameter corresponding to the outer diameter of tube 15, and has an outer diameter somewhat less than the outer diameter of annular passage 14. Affixed to the forward end of plunger sleeve 35 is a cylindrical cuff 36, the bore of which has a diameter corresponding to the outer diameter of tube 15. However, the outer diameter of cuff 36, unlike the outer diameter of tube 15, corresponds to the outer diameter of annular passage 14 thereby forming an annular shoulder 37 extending radially beyond the outer cylindrical surface of plunger sleeve 35. The combined length of plunger sleeve 35 and cuff 36 is such that when the forward annular face 38 of the cuff abuts the corresponding rearward annular face 49 of sleeve 43, the explusion face 31 of plunger 30 is at or in close proximity to needle tip 22. Furthermore the relative lengths of plunger sleeve 35 and cuff 36 are such that when annular shoulder 37 of the cuff abuts the inner face of ferrule 13, the expulsion face 31 of plunger 30 is positioned at a desired locus within the forward end of tubular body 10 behind aperture 46, preferably within the bore 41 of the boss assembly behind aperture 46 but ahead of collet 44.

A union is effected between plunger sleeve 35 and cuff 36 by any suitable method such as those mentioned hereinabove although again it is entirely feasible to manufacture an integral unit corresponding to these elements taken in combination.

It will now be apparent that as the plunger 30 slidably travels along the uniform central longitudinal bore which extends throughout tubular body 10 and needle 20, the plunger sleeve 35 and its associated cuff 36 slidably travel along the uniform annular passage 14.

A number of advantageous features accrue from this particular construction described with reference to FIGURE 3. In the first place, the combination of the annular passage 14, plunger sleeve 35 and cuff 36 acting through thumb button 32 tends to keep the plunger 30 in precise axial alignment with the continuous bore throughout the body 10 and needle 20 and thereby prevents, or at least markedly diminishes, the likelihood in normal use of breakage of, or damage to, the plunger and of encountering uneven wear of the plunger stem or face, or both. This in turn prevents, or at least markedly diminishes, the occurrence of premature wear of, or damage to, the collets 44 and 47 thereby enabling them to continue their role as sealing means for a relatively long period of time.

Furthermore, because cuff 36 has an outer diameter in excess of the outer diameter of plunger sleeve 35, (a)

cuff 36 serves as a stop of rearward piston travel and (b) frictional losses are minimized since, in contributing to the maintenance of the precise axial alignment referred to above, only the outer cylindrical surface of cuff 36 slidably contacts the adjoining or outer wall of annular passage 14. Neither of these advantages would be possible by providing a plunger sleeve having a uniform wall thickness corresponding to that of cuff 36.

An exemplary syringe of this invention constructed pursuant to FIGURE 3 is composed of a stainless steel needle approximately 3 inches long and having an outer diameter of about 1/32 of an inch and a bore capacity of about 2 microliters mounted on a chrome plated brass boss approximately 1 inch long and about 5/8 of an inch in diameter. The vent tube carried by the boss protrudes at a right angle therefrom for slightly over 5/8 of an inch, this tube having an outer diameter of about 1/8 of an inch and a bore of about 1/32 of an inch. This tube is also chrome plated. The glass barrel to which the boss is attached is approximately 3½ inches long and about 9/16 of an inch in diameter, and has a graduated 2 microliter scale printed thereon. The bore in the glass barrel is about 1/16 of an inch in diameter and is fitted with a stainless steel inner tube extending to the boss assembly, this tube being about 1/32 of an inch in diameter. The plunger is a stainless steel wire approximately 7½ inches long, the stainless steel plunger sleeve being about 3½ inches in length and about 3/64 of an inch in diameter. There is a loose slip fit between the wire plunger and the hollow needle bore which minimizes the possibility of wear on the plunger by the cylinder such as would more readily occur in the case of a precision fit between these two members. The ferrule is made of difluoromethylene polymer (polytetrafluoroethlyene) and the thumb button is composed of chrome plated brass. It will be appreciated, of course, that the dimensions and the materials of construction just described are in nowise to be construed as limitative in any sense of the word.

Other suitable dimensions and materials of construction for the syringes of this invention will now be apparent to those skilled in the art.

FIGURE 4 illustrates another particularly preferred syringe construction of this invention.

In this embodiment the barrel 11 is provided with a relatively large bore 12 and is divided into two segments joined in axial alignment by means of a sealing means assembly designated generally by the numeral 60. The interior portions of assembly 60 are composed of sleeve 43 communicating with tubular collet 44 which in turn communicates with cylindrical sleeve 45 containing aperture 46 leading to vent line 42. The forward end of sleeve 45 communicates with tubular collet 47 which in turn communicates with sleeve 50. The bores of sleeves 43, 45 and 50 are preferably equivalent to each other and to the bore 12 of barrel 11. Plunger stem 30 normally has a diameter which is not precisely fitted or closely fitted to either the barrel bore 12 or to the bores of sleeves 43, 45, and 50, although it may be, if desired. Thus in the usual case there will be a loose slip fit between the plunger 30 and the bores just mentioned, a tolerance therebetween of up to about 0.01 inch annular clearance being quite suitable. Tubular collets 44 and 47 on the other hand do cooperate with plunger stem 30 to form a high pressure seal by virtue of the tension existent within these resilient members. Sleeves 43 and 50 extend into matching annular recesses 62 and 64, respectively, within the barrel 11 and therefore these sleeves serve as convenient means for attaching assembly 60 onto the respective ends of barrel 11 so as to form a sturdy overall tubular body 10.

In the device depicted in FIGURE 4 the two segments of barrel 11 are of approximately equal lengths and vent tube 42 is located in proximity to the midpoint between the ends of tubular body 10. However, it will be appreciated and understood that this is not a limiting feature. Thus the respective segments of barrel 11 may differ considerably in length, or, in other words, the locus of communication between tube 42 and bore 12 may be positioned at any suitable place between the ends of tubular body 10, even near the back end thereof so long as there is a sufficient length of bore 12 rearwardly of aperture 46 to support the plunger when retracted past this aperture, as in a cleansing or filling operation. This flexibility in the positioning of vent tube 42 relative to the tubular body 10 enables the manufacture of syringes having an assortment of sample capacities.

As noted hereinabove, the syringe construction exemplified by FIGURE 4 is well suited for use in delivering measured volumes of gases, the vent line greatly facilitating the filling operation and the sealing means preventing escape of the gas so that it may be expelled through the needle.

In the construction of FIGURE 4 needle 20 is fastened to the forward end of tubular body 10 by any suitable method such as cementing. This axially aligns needle bore 21 with the larger diameter bore 12 within the body. Plunger 30 is long enough that when its expulsion face 31 abuts the annular shoulder 66 about the inner end of needle 20, a portion of the plunger stem extends rearwardly beyond an aperture generally centrally located within the face of ferrule 13. A graduated scale will usually be affixed to the body or to the plunger stem.

Another feature of the construction of FIGURE 4 is that it is readily adapted for interchange of needles. For example, the needles may be threaded on their rearward ends and detachably attached to the body by means of a matching thread, as at 68.

As many widely different modes of practicing this invention without departing from its spirit and scope will now be evident to those skilled in the art, it is not intended that this invention be unduly limited by the foregoing illustrative drawings and description.

What is claimed is:

1. In a needle syringe wherein a body and a needle have a communicating bore, an elongate plunger mounted to slidably travel with a loose slip fit within said bore; a vent line laterally communicating with said bore, the vent line being blocked off by the plunger as it commences travel toward the needle; and sealing means adapted to cooperate with the plunger stem to effect a high pressure seal on both sides of the locus of said lateral communication without preventing slidable travel of the plunger stem therethrough.

2. The apparatus of claim 1 further characterized in that said sealing means are composed of resilient tubular collets acting under tension upon the plunger stem.

3. The apparatus of claim 1 further characterized in that said sealing means are composed of at least one sleeve of non-elastic bearing material precisely fitted to the plunger stem.

4. In a syringe, a tubular body, a needle mounted on an end thereof and having a longitudinal bore axially communicating with a longitudinal bore within the body, an elongate plunger mounted to slidably travel with a loose slip fit within at least the bore within the body, a vent line laterally communicating with said bores at a locus relatively remote from the needle tip yet ahead of the expulsion end of the plunger when retracted in the body, at least that portion of the bore extending from just behind such point of retraction to the tip of the needle being essentially uniform throughout, and sealing means positioned at both sides of said locus and adapted to operate upon the peripheral surface of that portion of the plunger which slidably travels therethrough to effect a high pressure seal without preventing such slidable travel.

5. In a syringe, a tubular body; a needle mounted on an end thereof and having a uniform longitudinal bore axially communicating with a longitudinal bore within the body; an elongate plunger slidably mounted within the bores; a vent line positioned near the forward end of the body and laterally communicating with said bores at a locus ahead of the expulsion end of the plunger when retracted into the body; means tending to confine the slidable travel of the expulsion end of the plunger to between the point of such retraction and the needle tip, at least that portion of the bore extending from just behind such point of retraction to the tip of the needle being essentially uniform throughout; and a pair of tubular collets made of flexible resilient material positioned within the forward end of the body and coaxially aligned with the bore therein, such collets being on each side of the locus of communication between said last-named bore and the vent line, the collets being closely fitted to the stem of the plunger so as to effect a seal therewith without preventing slidable travel of the plunger stem therethrough.

6. A syringe comprising a barrel having a bore longitudinally positioned therein, said barrel having a hollow boss assembly mounted on an end thereof; an elongate needle having a uniform bore longitudinally positioned therein, the needle being carried by and extending from the end of the boss assembly so that the needle bore is in axial communication with the barrel bore, the bore within the needle and within the boss assembly being of essentially the same diameter; an elongate plunger slidably mounted within the bores; a vent line positioned on the boss assembly and laterally communicating with the bore therein, a pair of tubular collets made of flexible resilient material positioned within the boss assembly and coaxially aligned with the bore therein, such collets being on each side of the locus of communication between said last-named bore and the vent line, the collets being closely fitted to the stem of the plunger and under tension sufficient to effect a high pressure seal therewith yet insufficient to prevent slidable travel of the plunger stem therethrough; and means operative within the barrel tending to restrict the slidable travel of the expulsion end of the plunger to between the tip of the needle and a locus within the bore of the boss assembly behind said locus of communication.

7. The apparatus of claim 6 wherein the diameter of the bore within the needle and within the boss assembly is less than the diameter of the barrel bore.

8. The apparatus of claim 6 wherein the diameter of the bore within the needle and within the boss assembly is equivalent to the diameter of the barrel bore.

9. A syringe comprising a barrel having a bore longitudinally positioned therein, said barrel having a hollow boss assembly mounted on an end thereof and an aperture-containing ferrule mounted on the other end thereof; an elongate needle having a uniform bore longitudinally positioned therein, the needle being carried by and extending from the end of the boss assembly so that the needle bore is in axial communication with the barrel bore, the bore within the needle and within the boss assembly being of the same diameter but less than the diameter of the barrel bore so as to form an annular shoulder; an elongate plunger which is slidably mounted within and exceeds the length of the bores, and extends through the aperture of the ferrule; a vent tube positioned on the boss assembly and laterally communicating with the bore therein; a pair of tubular collets made of flexible resilient material positioned within the boss assembly and coaxially aligned with the bore therein, such collets being on each side of the locus of communication between said last-named bore and the vent tube, the collets being closely fitted to the stem of the plunger and under tension sufficient to effect a high pressure seal therewith yet insufficient to prevent slidable travel of the plunger stem therethrough; and collet means mounted on the plunger stem, said collet means cooperating with said ferrule and said shoulder thereby tending to restrict the slidable travel of the expulsion end of the plunger to between the tip of the needle and a locus within the bore of the boss assembly behind said locus of communication, said collet means cooperating with the barrel bore thereby tending to keep the plunger stem axially aligned as the plunger is caused to slidably travel.

10. A syringe comprising a tubular body having an essentially uniform bore extending along the entire longitudinal axis thereof and an annular passage coaxially aligned with said bore and extending from the back end of the body to a locus approaching the forward end of the body; a needle mounted on the forward end of the body and having a uniform longitudinal bore axially communicating with the bore within the body, the diameters of said bores being equivalent; an elongate plunger mounted to slidably travel in said bores, the plunger having a length in excess of the length of the combined bore of the body and the needle; a button mounted on the back end of the plunger; a cylindrical sleeve mounted on the button concentrically about the plunger, said sleeve having an inner diameter corresponding to the inner diameter of said passage and an outer diameter less than the outer diameter of said passage; a cylindrical cuff mounted on the forward end of the sleeve, said cuff having an inner diameter and an outer diameter corresponding respectively to the inner and outer diameters of said passage thereby forming an annular shoulder on the rearward face of the cuff; a ferrule mounted on the back end of the body and having an aperture corresponding in diameter to the outer diameter of the sleeve; the length of the sleeve plus the cuff relative to the plunger being such that when the forward end of the cuff abuts the forward end of the passage the expulsion end of the plunger is in close proximity to the tip of the needle and when the annular shoulder of the cuff abuts the inner face of the ferrule about the aperture therein the expulsion end of the plunger is within the forward end of the body.

11. The apparatus of claim 10 further including a vent line laterally communicating with said bores at a locus within the forward end of the body ahead of the expulsion end of the plunger when retracted into the body.

12. The apparatus of claim 10 further including a vent line laterally communicating with said bores at a locus within the forward end of the body ahead of the expulsion end of the plunger when retracted into the body, and sealing means positioned at both sides and in proximity to the locus of communication between the vent line and said bores, said sealing means being adapted to operate upon the forward cylindrical surface of the plunger.

13. The apparatus of claim 10 further including a vent line laterally communicating with said bores at a locus within the forward end of the body ahead of the expulsion end of the plunger when retracted into the body, and a pair of tubular collets made of flexible resilient material positioned within the forward end of the body and forming a portion of the bore therein, such collets being on each side of the locus of communication between the vent line and said bores, the collets being closely fitted to the stem of the plunger so as to effect a seal therewith without preventing slidable travel of the plunger stem therethrough.

14. In a syringe, a tubular body, a needle mounted on an end thereof and having a longitudinal bore axially communicating with a larger diameter bore within the body, an elongate plunger slidably mounted within the larger diameter bore of the body and fitted thereto by a loose slip fit, a vent line laterally communicating with the larger diameter bore at a locus between the ends of the body, and sealing means positioned within the body adjacent both sides of said locus, said sealing means being adapted to cooperate with the plunger stem to effect a high pressure seal therewith yet permit slidable travel of the plunger therethrough.

15. The apparatus of claim 14 wherein said sealing means are composed of resilient tubular collets acting under tension upon the plunger stem.

16. The apparatus of claim 14 wherein said sealing means are composed of at least one sleeve of nonelastic bearing material precisely fitted to the plunger stem.

References Cited

UNITED STATES PATENTS

| | | |
|---|---|---|
| 827,693 | 7/1906 | Korb. |
| 1,027,216 | 5/1912 | Sapp _____ 128—218 |
| 3,101,084 | 8/1963 | Hamilton. |
| 3,203,455 | 8/1965 | Horabin _____ 141—329 |
| 3,216,616 | 11/1965 | Blankenship _____ 222—47 |
| 3,223,282 | 12/1965 | Kloehn _____ 222—41 |

FOREIGN PATENTS

| | | |
|---|---|---|
| 365,912 | 12/1822 | Germany. |
| 3,955 | 1908 | Great Britain. |
| 148,588 | 6/1962 | Russia. |

DALTON L. TRULUCK, *Primary Examiner.*